United States Patent [19]

Doree et al.

[11] Patent Number: 4,774,133

[45] Date of Patent: * Sep. 27, 1988

[54] ARTICLE CONTAINING MICROENCAPSULATED MATERIALS

[75] Inventors: Richard H. Doree, St. Paul; Josef V. Ugro, Jr., Mahtomedi, both of Minn.

[73] Assignee: Minnesota Mining and Manufacturing Company, St. Paul, Minn.

[*] Notice: The portion of the term of this patent subsequent to Jan. 12, 2001 has been disclaimed.

[21] Appl. No.: 880,050

[22] Filed: Jun. 30, 1986

Related U.S. Application Data

[63] Continuation of Ser. No. 699,660, Feb. 8, 1985, Pat. No. 4,654,256.

[51] Int. Cl.$^4$ .............................................. B32B 3/26
[52] U.S. Cl. .............................. 428/321.5; 428/304.4; 428/327; 428/402.2; 428/402.21; 428/402.22; 428/522; 428/523

[58] Field of Search .................... 428/63, 304.4, 321.5, 428/327, 402.2, 402.21, 402.22, 522, 523

[56] References Cited

U.S. PATENT DOCUMENTS 4,493,869  1/1985  Sweeny et al. .................. 428/201
4,528,226  7/1985  Sweeny ............................ 428/40

*Primary Examiner*—Bruce H. Hess
*Attorney, Agent, or Firm*—Donald M. Sell; David L. Weinstein

[57] ABSTRACT

Articles comprising a thermoplastic substrate bearing rupturable microcapsules in a binder on at least one surface thereof. These articles can be applied by means of heat and pressure to porous objects. The process of applying the articles to porous objects further results in partially embedding the microcapsules in the substrate. Thermoplastic substrates having rupturable microcapsules partially embedded therein, but not having a binder, are another aspect of this invention.

8 Claims, 1 Drawing Sheet

ARTICLE CONTAINING MICROENCAPSULATED MATERIALS

This is a continuation of application Ser. No. 699,660 filed Feb. 8, 1985, now U.S. Pat. No. 4,654,256.

FIELD OF THE INVENTION

This invention relates to microencapsulated materials, articles containing microencapsulated materials, and a method of applying such articles to various substrates.

BACKGROUND OF THE INVENTION

Encapsulated materials have been used for many years in a wide variety of commercial applications. U.S. Pat. No. 3,016,308 discloses one of the early efforts using encapsulated material as the image source on recording paper. U.S. Pat. Nos. 4,058,434 and 4,201,404 show other methods of application of encapsulated coloring materials on paper substrates to be used as imaging media and the like. In addition to release of physically observable materials such as ink in order to form a visible image, other types of active ingredients such as odor releasing materials, bacteriostatic materials, chemically active materials and the like have been provided in encapsulated form.

A wide variety of processes exist by which microcapsules can be manufactured. These varied processes provide different techniques for producing capsules of varying sizes, alternative materials for the composition of the capsule shell, and various different functional materials within the shell. Some of these various processes are shown in U.S. Pat. Nos. 3,516,846; 3,516,941; 3,778,383; 4,087,376; 4,089,802; 4,100,103 and 4,251,386 and British patent specification Nos. 1,156,725; 2,041,319 and 2,048,206. A wide variety of different materials may be used in making the capsule shells, including gelatin and synthetic polymeric materials. A popular material for shell formation is the polymerization reaction product between urea and formaldehyde or melamine and formaldehyde, or the polycondensation products of monomeric or low molecular weight polymers of dimethylolurea or methylolated urea with aldehydes. A variety of capsule forming materials are disclosed, for example, in U.S. Pat. Nos. 3,516,846 and 4,087,376 and British patent specification Nos. 2,006,709 and 2,062,570.

As shown in these references, the principal utility of microencapsulated materials is in the formation of a surface coated with the microcapsules dispersed in a binder. The microcapsules are rupturable by various means to release the material contained therein. U.S. Pat. No. 4,493,869 discloses a means of releasing liquid from a rupturable microcapsule by pressure or applied shear to the capsule layer, e.g., by scratching or scraping as with a fingernail.

It has been desired to employ appliques bearing rupturable microcapsules as a means for enhancing clothing, such as, for example, T-shirts Several problems exist with respect to providing microcapsule-bearing appliques that can easily be applied to the fibrous materials of clothing. First, the appliques must be easily printable by the manufacturer thereof. Second, the appliques and the microcapsules associated therewith must be resistant to washing conditions encountered in a typical washing machine.

Patches made of fabric material impregnated with cross-linkable or waterproof binders and microcapsules and having a hot melt adhesive on one surface have been used as iron-on appliques. These patches are difficult to print with high resolution due to their fibrous and porous nature. When processed on web fed equipment they are difficult to die cut to the shape of the design without special catching and packaging equipment; hence, they are often made in sheet form with the ultimate user cutting out the patch for application, generally resulting in a patchy appearance to the applique. Iron-on applqques made from flocked fibers, silk screen printed and coated with a hot melt adhesive and used as a transfer material are available, but they do not contain microcapsules, and are expensive to produce. Transfer decals made as iron-on transfers and composed of vinyl plastisol inks are available, but they also do not contain microcapsules or other means for imparting fragrances and the like.

SUMMARY OF THE INVENTION

In one aspect, the present invention involves a novel article which comprises a thermoplastic, preferably flexible, substrate having on one surface thereof a coating comprising a binder resin having rupturable microcapsules dispersed therein.

The properties of the substrate are such that, by the application of heat and pressure thereto, it is capable of softening sufficiently to allow the microcapsules to be partially embedded in the surface thereof. In addition, the substrate, under the influence of heat and pressure, is capable of softening sufficiently so that the thermoplastic material thereof can flow sufficiently to allow the substrate to become strongly bonded to porous objects such as fabrics.

The article is capable of being printed inexpensively on web-fed flexographic presses with good print resolution, is capable of being die cut to shape, and is capable of being made inexpensively. The article can be applied to porous objects for decorative purposes by means of heat and pressure from a conventional household iron or with equipment conventionally used to apply decals or iron-on transfers. The article can also be used as a means to supply fragrances to graphics that have been previously applied on porous objects.

In another aspect, the present invention involves a novel article comprising a thermoplastic, preferably flexible, substrate having partially embedded therein rupturable microcapsules. In this embodiment, no binder resin is required. This article can be used in situations where good retention and protection of microcapsules is required, but where access to the microcapsules must be retained. The article can be used to cover walls, shelves, and other surfaces.

DETAILED DESCRIPTION OF THE INVENTION

Figure 1:
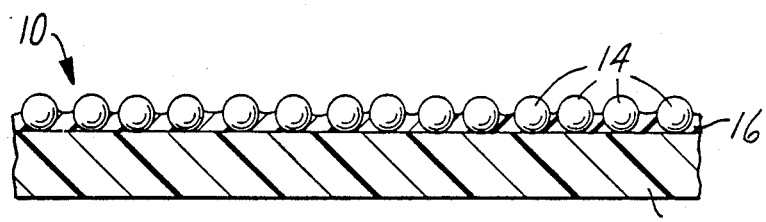
FIG. 1 is a cross-sectional view of one embodiment of this invention.

The article 10 shown in FIG. 1 comprises a substrate 12 having on one surface thereof a coating comprising rupturable microcapsules 14 dispersed in a binder resin 16.

The substrate 12 is a film or sheet material which may be of any thermoplastic polymeric material as long as the material can be made to soften under certain conditions of temperature and pressure. The mechanical properties of the substrate are such that upon application of heat and pressure thereto, the surface of the substrate bearing the microcapsules will soften sufficiently to allow the microcapsules to become partially embedded in the surface thereof by the application of pressure significantly below the pressure that will result in rupture of the microcapsules. As used herein, "partially embedded" means embedded to the extent wherein the microcapsules can be accessed by the means which will be used to subsequently rupture them. A partially embedded microcapsule will have a portion of its shell wall protruding from the surface of the substrate.

It is preferred that the material of the substrate be able to soften and flow sufficiently to flow into the voids of a porous object 18 (see FIG. 2) to allow the substrate also to become adherently bonded to that object. For application to a fabric, e.g., a cotton T-shirt, it is preferred that the substrate be able to soften and the material thereof flow at a temperature between about 100° C. and about 250° C. so that the flowing material of the substrate can flow around the fabric fibers to be in position to achieve a durable bond between the substrate and fabric without scorching or otherwise damaging the fabric. The material of the substrate must not flow so excessively that the microcapsules are totally embedded therein so as to be unaccessible to the rupturing means. In addition, penetration of the substrate too deeply into the object should also be avoided. Temperatures and pressures for partially embedding the microcapsules in the substrate and adhering the substrate to a porous object can vary, depending on the particular polymeric material of the substrate. Thermoplastic materials in general exhibit a more or less well-defined transition temperature, usually called the "flow temperature", which temperature is taken to mean the location of the region of transition from the rubbery to the viscofluid state on the temperature axis of a plot of strain versus temperature. See Encyclopedia of Polymer Science and Technology, vol. 8, Interscience Publishers, 1968, p. 448–449. The flow temperature depends upon a number of factors, such as, for example, polymer structure, molecular weight, the presence of additives, e.g., plasticizers, strain frequency, and strain levels, etc.

At some point in the embedding/bonding process, the temperature of the material of the substrate must exceed this flow temperature as pressure is being applied. The embedding and bonding temperature used for a given substrate material depends upon the hot flow properties of the material, which in turn depend upon the duration of exposure to heat and pressure, the applied pressure, and the viscosity of the material at the maximum temperature experienced in the process. The lower the viscosity of the substrate material at the maximum temperature experienced in the process, the nearer this maximum temperature will be to the flow temperature. For some polymeric materials, the viscosity near the flow temperature is so low that the embedding/bonding process cannot be controlled sufficiently to prevent total microcapsule penetration into the substrate or excessive penetration of the article into the object to which it is being bonded. Such uncontrollable materials are typically low molecular weight materials such as waxes. viscosities at the flow temperature should be at least $10^6$ mPa.s (milliPascal seconds) as measured in accordance with ASTM D3236-73 (1978). Materials having a high viscosity at the flow temperature require either that the maximum temperature be well in excess of the flow temperature or that the duration of exposure at that maximum temperature be sufficiently high to achieve the desired effect. It is preferred that softening and flowing conditions be pressures in the range of 0.5 to 100 pounds per square inch gauge (psig), more preferably 0.5 to 50 psig, at temperatures in the range of 100°–250° C. Film materials such as polyvinyl resins, e.g. plasticized polyvinyl chlorides, polyolefins, and the like can be used in the preferred range of conditions. The thickness of the film material can vary, with a preferred range being from about 0.01 to about 0.3 mm. It is also preferred that the polymeric film be flexible in order to facilitate storage and use thereof.

The microcapsules 14 useful in the present invention may comprise any rupturable capsule containing a liquid ingredient therein. The shell wall material of the microcapsules must exhibit sufficient strength to withstand the heat and pressure conditions employed to partially embed them in the substrate. It is to be expected that some microcapsules will rupture during the embedding process; however, it is preferred that no more than about 10% rupture during that process. Microcapsules having shell walls of aminoplast resins, e.g., urea/formaldehyde, melamine/formaldehyde, are especially useful for use in this invention. The material contained in the microcapsules can be any of a variety of liquids, including solutions, dispersions, and gelled materials. Preferred types of ingredients are organic oils which are fragrance-releasing materials which readily volatilize upon rupturing of the microcapsule. These may or may not also be colored. Other useful materials are antistatic, antibacterial, antifungal materials, etc. The size of the microcapsules should generally be in a range of an average diameter between 3 and 30 micrometers when the microcapsule payload is between 40 and 95% by weight of load to microcapsule.

The nature and composition of the binder 16 is not critical to the practice of the invention as long as the binder is capable of adherently bonding the microcapsule to the substrate. The quantity of binder must be sufficient to hold the microcapsules in place on the surface of the substrate until heat and pressure are applied to partially embed the microcapsules in the substrate. For certain applications where the binder must perform other functions than merely binding the microcapsule to the surface of the substrate until the article is applied to a porous object, e.g. providing a measure of abrasion protection to previously applied inks, other properties may be required. Many classes of polymeric binders may be used including, but not limited to, polyurethanes, polyacrylates, polyvinyl resins, polyamides, polyolefins, etc. In applications requiring extensive wash resistance, binders formed from latexes of vinyl chloride and ethylene/vinyl chloride copolymers have been shown to provide the best protection of inks on polyethylene substrates. Binders having low cross-linking are preferred, because highly crosslinked binders can often inhibit microcapsule embedding.

Additional particulate materials, e.g., pigments, can be added to the coating containing binder and microcapsules to obtain additional decorative and functional properties.

Figure 3:
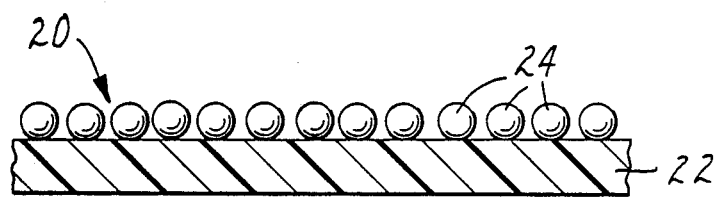
FIG. 3 is a cross-sectional view of an intermediate used to prepare another embodiment of this invention.

In another embodiment of the invention, a binder may not be required. As shown in FIG. 3, the surface of the substrate 22 can be dusted with microcapsules 24 and then immediately exposed to heat and pressure from a device such as a hot calender roll to achieve partial embedding of microcapsules (see FIG. 4).

The coating weight of binder and microcapsules can be varied, but is preferably approximately one pound for 500 to 8000 square feet. More preferably, the coating weight is between approximately one pound for each 600 to 2000 square feet. The microcapsules preferably comprise between 30 and 95 percent by weight of the total coating composition, and more preferably between 50 and 90 percent by weight of the total coating composition.

Methods for applying the binder (with microcapsules) to the substrate can vary, depending upon available methods and economics more than any other parameter. Suitable application methods include air knife, gravure coating, and printing methods including silk screening, gravure, and flexographic techniques.

The binder (with microcapsules) may be applied either in a continuous or discontinuous pattern on the substrate or in a printed image on the substrate. The binder pattern usually corresponds to the pattern of a printed image but it may be random or generally applied over the entire printed surface.

The article 10 may be precut such that the perimeter thereof corresponds to the edge of a printed image in which it will be in register, or any shape may be cut (i.e. circular, rectangular, triangular, irregular).

For purposes of printing, dye cutting, and trial positioning of the article 10 prior to application of heat and pressure, the side of the article not bearing the binder and microcapsules can be coated with a conventional pressure sensitive adhesive.

Figure 2:
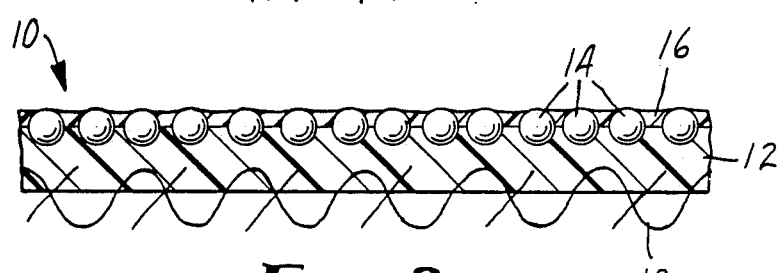
FIG. 2 is a cross-sectional view of the embodiment of FIG. 1 after it has been applied to a porous object.

FIG. 2 shows how article 10 appears after it has been applied to a porous object 18 such as a fabric. The article can be applied to porous objects by application of heat and pressure. As indicated previously, it is preferred that the microcapsules 14 become partially embedded in the substrate 12 at the time the substrate 12 is being bonded to the porous object 18. To prevent sticking of the article to the heat source it is desirable to prevent contact directly with the heated surface by an intervening silicone coated paper layer, conventionally called a silicone release liner. The release liner is placed between the layer containing the microcapsules and binder and the source of heat and pressure, e.g. a household iron. The precise manner of heating and applying pressure to the substrate through the release liner is apparent to one of ordinary skill in the art. Application temperatures and pressures will vary depending upon the softening properties of the substrate material and scorch temperature of fabrics to which the article is applied. For application to fabrics such as cotton, temperatures between about 325° F. and about 450° F. (about 160° C. to about 230° C.), pressures in the range of from about 0.5 to about 30 psig, and heating time between about 5 and about 120 seconds are desirable depending on the particular fabric so that the microcapsules can be partially embedded in the substrate and the substrate material can flow around the fabric fibers to achieve a durable bond between the substrate and fabric, on cooling, without adversely affecting the fabric. The thermal sensitivity characteristics of the fabric may influence the choice of substrate material since the softening characteristics of a given substrate material may require the use of temperatures in excess of those that would normally damage the fabric. For example, nylon fabrics will melt at temperatures near 400° F. (204° C.).

Figure 4:
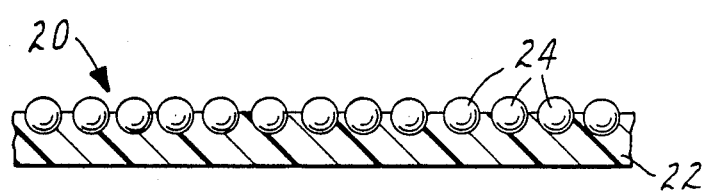
FIG. 4 is a cross-sectional view of the embodiment prepared from the intermediate of FIG. 3.

The article 20 shown in FIG. 4 comprises a substrate 22 having microcapsules 24 embedded therein. The substrate and microcapsules must exhibit the same characteristics as substrate 12 and microcapsules 14 described previously. Methods for embedding the microcapsules in the substrate can vary. As discussed previously, one method involves dusting free microcapsules 24 onto a surface of the substrate 22 (see FIG. 3) and then applying a sufficient amount of heat and pressure to partially embed the microcapsules in the substrate. The heat and pressure parameters are identical to those employed to embed the microcapsules in the embodiment shown in FIG. 1.

The article of FIG. 4 can be used for such purposes as wall coverings, shelf coverings, and surface coverings in general.

EXAMPLE 1

A corona treated polyethylene tape (3M Medical Products Blenderm ®) was coated on one surface with a coating containing 64% by weight microcapsules, and 36% by weight polyvinyl alcohol binder (Gelvatol ® 40-10). The polyethylene tape, which had a Vicat softening temperature of 90° C., functioned as the substrate. The microcapsules contained a blue dye and an oil which exhibited a peppermint fragrance. The microcapsule payload was approximately 70% by weight and the shell wall was approximately 30% by weight of the microcapsules' total weight.

A 2-inch square patch of this tape was placed on T-shirt fabric, uncoated side in contact with the fabric. A silicone treated release liner was placed over the coated side. Heat and pressure were applied for 20 seconds with a Thermoseal Model HS-2 pressing apparatus, set at 400° F. and a pressure setting of 6 (corresponding to about 20 psig). After removal from the unit, the tape was allowed to cool, and the release liner removed. The polyethylene tape was firmly adhered to the fabric. The fabric bearing the applied patch was washed in 140° F. soapy water for 10 minutes. The washing resulted in only slight loss of the microcapsules, even though the polymeric binder was readily soluble in water. This result indicated that the microcapsules had been embedded and held by the polyethylene substrate. Microscopic examination of the patch showed that the microcapsules had become partially embedded in the polyethylene surface. Subsequent washings also failed to remove significant quantities of microcapsules from the surface. Scratching or rubbing of the patch gave release of noticeable amounts of peppermint fragrance. Throughout the washing trials, the polyethylene patch remained firmly bonded to the fabric.

A similarly washed patch which had merely been adhered to the fabric but had not been subjected to the aforementioned heat and pressure showed total loss of the microcapsules.

EXAMPLE 2

The polyethylene tape of Example 1 was printed on a Webtron 650 flexographic press with alcohol based ink (Flexolumes from Inmont Corp.). The print was then overcoated with floral fragrance-containing microcapsules in a coating similar to that in Example 1. Application of a 2-inch square patch of the tape to T-shirt fabric under heat and pressure as in Example 1 gave a firmly bonded fragranced applique. After the fabric was washed in soapy water at 160° F. for 10 minutes, fragrance was still detectable, but the inks readily rubbed off. Microscopic examination showed the presence of capsules partially embedded in the polyethylene surface.

EXAMPLE 3

The polyethylene tape of Example 1 printed as in Example 2 was overcoated with a composition consisting of 33% by weight lemon fragrance-containing capsules and 67% by weight of a modified ethylene/vinyl chloride copolymer (Airflex ® 4500 from Air Products Corp.). A 2-inch square patch of the tape was applied to a T-shirt fabric under heat and pressure as in Example 1. After the fabric was washed as in Example 2, lemon fragrance was still detectable on rubbing, the inks did not rub off, and the patch remained firmly bonded to the fabric.

EXAMPLE 4

The printed patch of Example 3, bonded on T-shirt fabric, was washed 5 times in a washing machine using a 12 minute hot wash and warm rinse cycle, with drying in between cycles. The printed patch retained its appearance, did not peel away from the fabric, and provided good fragrance upon rubbing or scratching.

EXAMPLE 5

The coating used in Example 3 was modified to include a small amount of a pearlescent pigment (Superpearl ® 100 manufactured by Mearl Corp.). A 2-inch square patch of the tape was applied to a T-shirt fabric under heat and pressure as in Example 1. The resulting patch had a shiny appearance which was retained after washing.

EXAMPLE 6

A commercial white opaque vinyl tape (Tekra Corp.) was coated with the coating formulation of Example 3. Application of a 2-inch square patch of the tape with the same heat and pressure settings as in Example 1 resulted in good bonding to T-shirt fabric and good retention of the capsule coating during washing.

Various modifications and alterations of this invention will become apparent to those skilled in the art without departing from the scope and spirit of this invention, and it should be understood that this invention is not to be unduly limited to the illustrative embodiments set forth herein.

We claim:

1. An article consisting of:
   (A) a thermoplastic polymer substrate,
   (B) on at least one surface of said substrate a layer comprising rupturable microcapsules carrying a liquid therein and a binder resin adhering the microcapsules to the substrate, said substrate bearing said microcapsules being capable of softening sufficiently when exposed to heat to allow said microcapsules to become partially embedded in said surface by means of applied pressure, said microcapsules being sufficiently strong to avoid rupture when exposed to the heat and pressure required to soften said substrate and embed said microcapsules, said substrate further being capable of softening sufficiently so that the thermoplastic material of the polymeric substrate can flow sufficiently to allow the substrate to become bonded to porous objects.

2. The article of claim 1 wherien said softening occurs under temperature conditions of from about 100° C. to about 250° C. and said partial embedding occurs under pressure conditions of from about 0.5 psig to about 100 psig.

3. The article of claim 1 wherein said substrate is selected from the group consisting of polyolefin polymers and polyvinyl polymers.

4. The article of claim 1 wherein said microcapsules comprise gelatin.

5. The article of claim 4 wherein said microcapsules have an average diameter between about 3 and about 30 micrometers.

6. The article of claim 1 wherein said microcapsules comprise aminoplast resin.

7. The article of claim 6 wherein said microcapsules have an average diameter between about 3 and about 30 micrometers.

8. The article of claim 1 wherein said microcapsules have an average diameter between about 3 and about 30 micrometers.

* * * * *

UNITED STATES PATENT AND TRADEMARK OFFICE
CERTIFICATE OF CORRECTION

PATENT NO. : 4,774,133

DATED : September 27, 1988

INVENTOR(S) : Richard H. Doree et al

It is certified that error appears in the above-identified patent and that said Letters Patent is hereby corrected as shown below:

Col. 1, line 61, insert a period after "T-shirts".

Col. 2, line 13, "applqques" should read --appliques--.

Col 8, line 12, "polymer" should read --polymeric--.

Signed and Sealed this

Sixth Day of June, 1989

Attest:

DONALD J. QUIGG

Attesting Officer

Commissioner of Patents and Trademarks